US012164251B2

(12) United States Patent
Kim

(10) Patent No.: US 12,164,251 B2
(45) Date of Patent: Dec. 10, 2024

(54) IMAGE FORMING APPARATUS

(71) Applicant: SHARP KABUSHIKI KAISHA, Sakai (JP)

(72) Inventor: Sungi Kim, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/204,742

(22) Filed: Jun. 1, 2023

(65) Prior Publication Data

US 2023/0393510 A1 Dec. 7, 2023

(30) Foreign Application Priority Data

Jun. 2, 2022 (JP) ................................ 2022-090050

(51) Int. Cl.
*G03G 15/00* (2006.01)

(52) U.S. Cl.
CPC ......... *G03G 15/5004* (2013.01); *G03G 15/80* (2013.01)

(58) Field of Classification Search
CPC ................................................ G03G 15/5004
See application file for complete search history.

(56) References Cited

U.S. PATENT DOCUMENTS

2014/0198337 A1 7/2014 Nakajima et al.
2015/0380927 A1 12/2015 Nakajima et al.
2020/0379393 A1* 12/2020 Nakazawa ........ H02M 3/33523
2021/0223726 A1* 7/2021 Fujikura ................. H02M 7/12
2022/0066358 A1* 3/2022 Yada .................... G03G 15/205
2024/0064254 A1* 2/2024 Kubo ..................... G03G 15/80

FOREIGN PATENT DOCUMENTS

JP 2014-138504 A 7/2014

* cited by examiner

*Primary Examiner* — Carla J Therrien
(74) *Attorney, Agent, or Firm* — ScienBiziP, P.C.

(57) ABSTRACT

An image forming apparatus includes a drive that is driven by alternating current (AC) power; a detector that detects input of direct current (DC) power to the drive; and a shutoff member that shuts off power supply to the drive based on a detection result by the detector.

4 Claims, 13 Drawing Sheets

IMAGE FORMING APPARATUS

CROSS-REFERENCE TO RELATED APPLICATION

The present application claims priority from Japanese Application JP2022-090050, the content of which is hereby incorporated by reference into this application.

BACKGROUND OF THE INVENTION

1. Field of the Invention

The disclosure relates to an image forming apparatus.

2. Description of the Related Art

For example, proposed as a conventional technique is an image forming apparatus including an overvoltage detection circuit. The overvoltage detection circuit detects that a voltage higher than a predetermined voltage is input to a nighttime power supply section from an alternating current (AC) power source. The image forming apparatus described in the conventional technique includes a triac that blocks the power supply to an emergency night power supply section by stopping the output of the voltage of the nighttime power supply section when the overvoltage detection circuit detects an overvoltage.

SUMMARY OF THE INVENTION

With the image forming devices described in the conventional technique, it may be difficult to suitably suppress the application of direct current (DC) voltage to the image forming apparatus.

The main object of the disclosure is to suitably suppress the application of DC voltage to an image forming apparatus.

An image forming apparatus according to an aspect of the disclosure includes a drive, a detector, and a shutoff member. The drive is driven by AC power. The detector detects input of DC power to the drive. The shutoff member shuts off the power supply to the drive on the basis of the detection result by the detector.

DETAILED DESCRIPTION OF THE INVENTION

The following is examples of preferred embodiments of the disclosure. However, the following embodiments are mere examples. The disclosure is not limited to the embodiments described below.

First Embodiment

Figure 1:
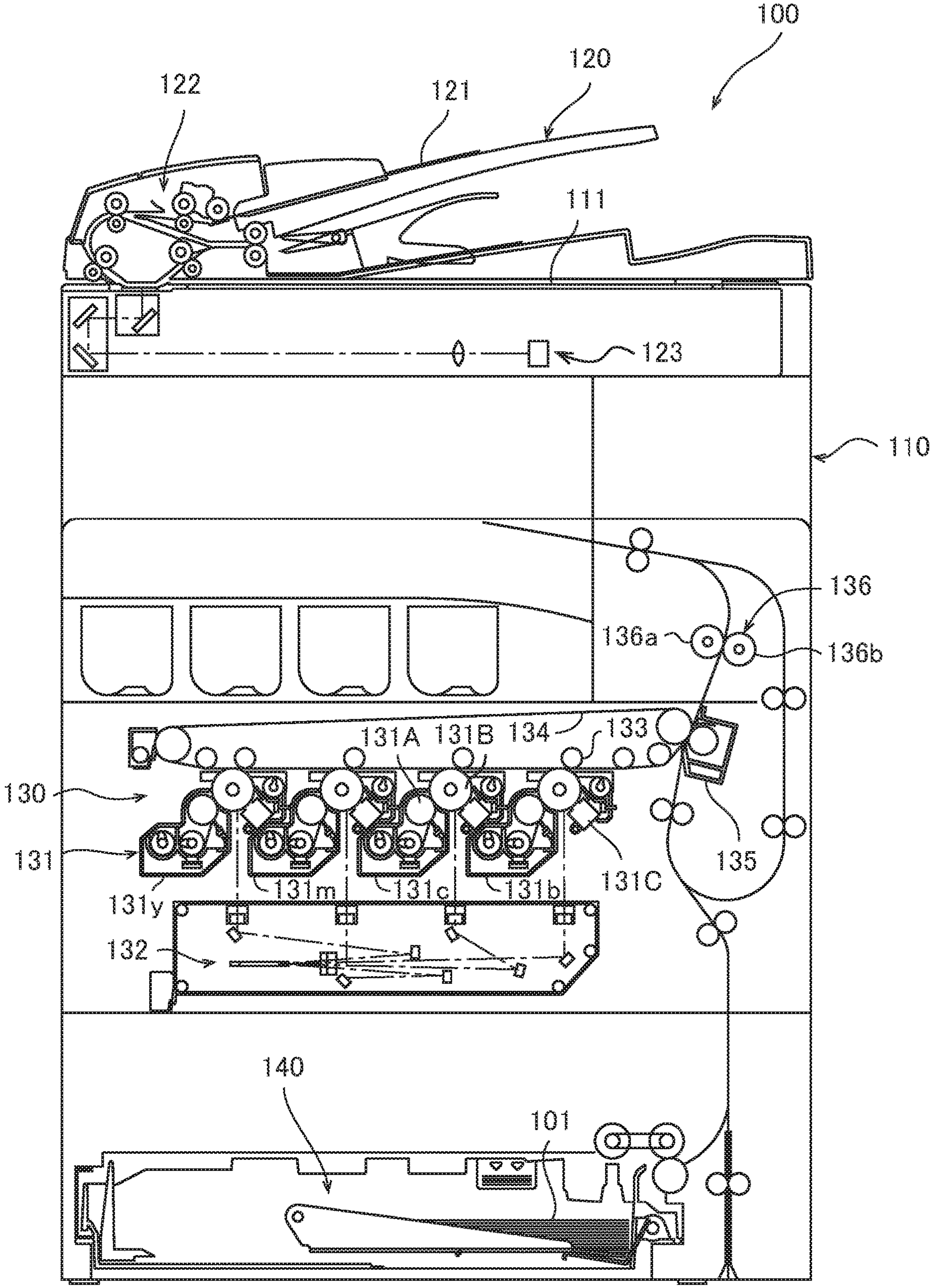
FIG. 1 is a schematic front view of the configuration of an image forming apparatus according to a first embodiment.

FIG. 1 is a schematic front view of the configuration of an image forming apparatus 100 according to the first embodiment.

In the disclosure, the term "image forming apparatus" refers to an apparatus that forms images on objects such as paper. Image forming apparatuses include, for example, printers and copiers.

The image forming apparatus 100 according to the present embodiment is a so-called multifunction peripheral having a copy function, a scanner function, a facsimile function, a printer function, and the like. The image forming apparatus forms scanned or received image data onto a sheet 101. The material, shape, etc., of the sheet 101 is not particularly limited so long as images can be formed. The material of the sheet 101 may be, for example, paper, resin, etc.

The image forming apparatus 100 includes a housing 110, an image reading device 120, an image former 130, and a sheet feeder 140.

The housing 110 is rectangular in shape with a top surface. The top surface of the housing 110 includes a reading surface 111.

The image reading device 120 reads an image formed on a document 121. The image reading device 120 includes an automatic document feeder 122 and an image reader 123.

The automatic document feeder 122 is positioned above the reading surface 111. The automatic document feeder 122 sends the document 121 from a loading tray to an ejection tray so that the document 121 passes over the reading surface 111.

The image reader 123 is disposed in the housing 110. The image reader 123 optically reads an image formed on the document 121 fed onto the reading surface 111 by the automatic document feeder 122 or placed on the reading surface 111, and acquires electronic data corresponding to the read image.

The image former 130 and the sheet feeder 140 are also disposed in the housing 110.

The sheet feeder 140 stores multiple sheets 101. The sheet feeder 140 feeds the stored sheets 101 one by one to the image former 130.

The image former 130 forms the image read by the image reading device 120 on a sheet 101. The image former 130 includes one or more image stations 131, an optical scanner 132, one or more intermediate transfer rollers 133, an intermediate transfer belt 134, a secondary transfer device 135, and a fusing device 136.

Toner is supplied to the image stations 131 from toner tanks. The image stations 131 form toner images.

For example, if the image forming apparatus 100 forms black and white images, the image former 130 may include one image station 131 corresponding to black.

In the present embodiment, the image former 130 forms color images. The image former 130 specifically includes multiple image stations 131 corresponding to colors different from each other.

Specifically, the image former 130 includes multiple image stations 131 including an image station 131*b* corresponding to black (B), an image station 131*c* corresponding to cyan (C), an image station 131*m* corresponding to magenta (M), and an image station 131*y* corresponding to yellow (Y). The image stations 131*b*, 131*c*, 131*m*, and 131*y* form toner images of mutually different colors corresponding to the respective stations.

In detail, the image stations 131 each includes a developing device 131A, a photoconductor drum 131B, and a charger 131C.

At each of the image stations 131, the surface of the photoconductor drum 131B is uniformly charged to a predetermined potential by the charger 131C. The optical scanner 132 exposes the surface of the charged photoconductor drum 131B in accordance with the shape of the image read in the image reading device 120. This forms an electrostatic latent image corresponding to the acquired image data on the surface of the photoconductor drum 131B.

The developing device 131A develops the electrostatic latent image. Specifically, toner is supplied onto the photoconductor drum 131B to form a toner image with a shape corresponding to the shape of the electrostatic latent image. The formed toner image is transferred onto the intermediate transfer belt 134 by the intermediate transfer rollers 133 provided for the respective image stations 131. Toner images of mutually different colors formed at the image stations 131 are superimposed and transferred to form a color toner image on the intermediate transfer belt 134.

The secondary transfer device 135 transfers the toner image formed on the intermediate transfer belt 134 onto a sheet 101. The sheet 101 with a toner image formed on its surface is transported to the fusing device 136.

The fusing device 136 fuses the toner image to the sheet 101. The fusing device 136 includes a fusing roller 136*a* and a pressure roller 136*b*. A sheet 101 with a toner image is inserted between the fusing roller 136*a* and the pressure roller 136*b*.

The fusing roller 136*a* includes an internal heater 136*c* (see FIG. 2) and can be heated. The pressure roller 136*b* presses the sheet 101 on which the toner image is formed toward the fusing roller 136*a*. The toner image is heated by the fusing roller 136*a*, and the heated toner image and the sheet 101 are pressed together by the fusing roller 136*a* and the pressure roller 136*b*. This fuses the toner image on the sheet 101, and an image is formed on the surface of the sheet 101. The sheet 101 with the image is ejected outside the housing 110.

Figure 2:
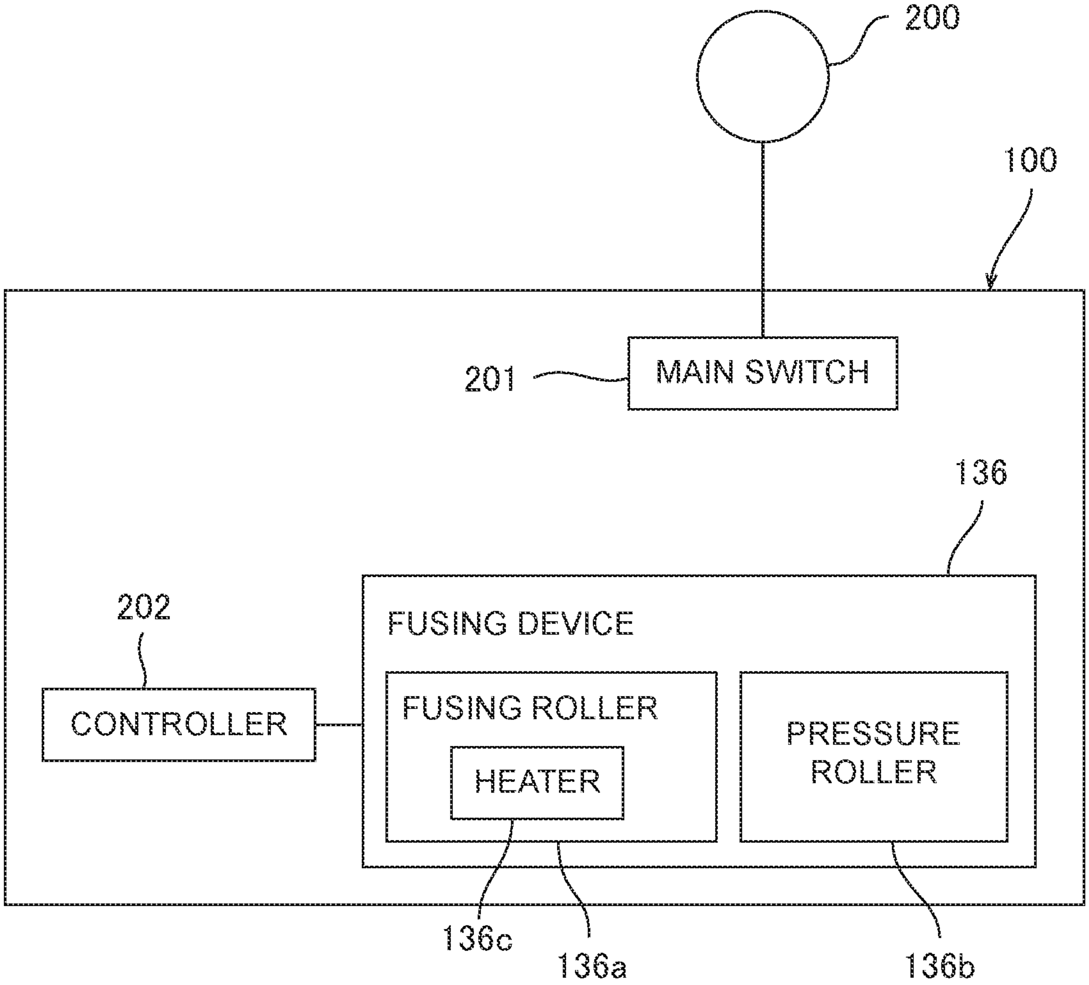
FIG. 2 is a schematic block diagram of a portion including a fusing device of the image forming apparatus according to the first embodiment.
Figure 3:
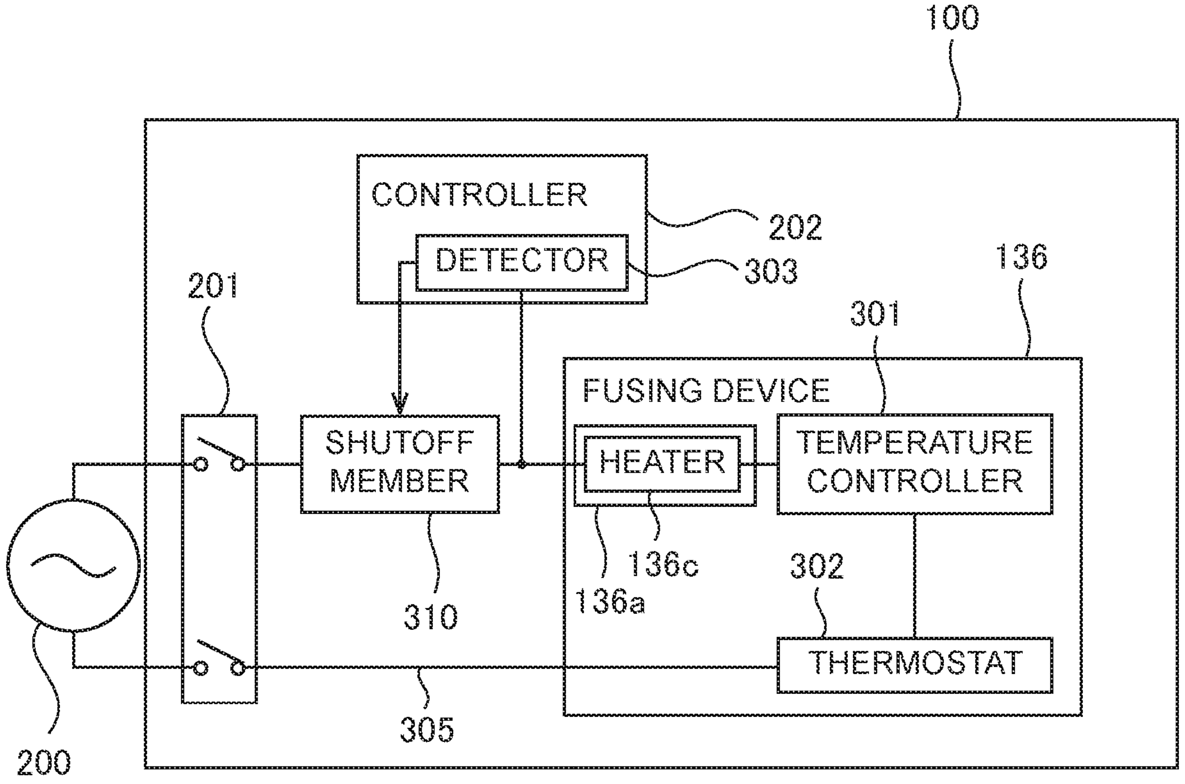
FIG. 3 is a schematic block diagram of a portion including the fusing device of the image forming apparatus according to the first embodiment.

FIGS. 2 and 3 are schematic block diagrams of a portion including the fusing device of the image forming apparatus according to the first embodiment.

As illustrated in FIG. 2, the image forming apparatus 100 is connected to an AC power source 200. The AC power source 200 supplies AC power to the image forming apparatus 100. The image forming apparatus 100 is driven by AC power supplied from the AC power source 200.

The AC power source 200 can be composed of, for example, a power conditioner that converts DC power to AC power for output. The AC power source 200 may, for example, be directly connected to a generator, such as a solar cell or fuel cell, or may be connected to a storage battery and convert the DC power supplied by the generator or the storage battery into AC power for output.

The method of converting DC power to AC power is not limited. The power conditioner may, for example, be a transformerless power conditioner that convert DC power to AC power with a converter instead of a transformer. That is, the power conditioner may include an inverter that converts DC power to AC power. The power conditioner may alternatively be a high-frequency isolation transformer type power conditioner that converts DC power to AC power with a transformer.

The present embodiment described below is an example in which the AC power source 200 is connected to a generator or storage battery, such as a solar cell, and is composed of a converter-type power conditioner that converts DC power into AC power for output.

For example, in a converter-type power conditioner, the possibility of isolating a DC current from an AC current is not always necessary. Therefore, in the case of a converter-type power conditioner, there is a risk of DC power being outputted from the power conditioner in the event of a power conditioner failure.

That is, in the AC power source 200, which converts DC power to obtain AC power, there is a risk of DC power being outputted to the image forming apparatus 100, for example, in the event of a malfunction. For example, there is a risk of only DC power being outputted or a mixture of AC power and DC power being outputted.

As illustrated in FIG. 2, the image forming apparatus 100 includes a main switch 201. The main switch 201 is connected to the AC power source 200. Power from the AC power source 200 is supplied to other components of the image forming apparatus 100 via the main switch 201. For example, the components of the image forming apparatus 100, such as the fusing device 136, and a controller 202 that controls these components are supplied with power from the AC power source 200 via the main switch 201. The main switch 201 is used to turn on or off the supply of power from the AC power source 200 to the image forming apparatus 100.

As illustrated in FIG. 3, the fusing device 136 is connected to the main switch 201. Therefore, when the main switch 201 is in an on-state, power from the AC power source 200 is supplied to the fusing device 136. The fusing device 136 is driven by AC power inputted from the AC power source 200. In the present embodiment, the fusing device 136 constitutes a drive.

The fusing device 136 includes a heater 136*c* disposed inside the fusing roller 136*a*, a temperature controller 301, and a thermostat 302. The temperature controller 301 and thermostat 302 are connected in series with the heater 136*c*. The thermostat 302 is positioned close enough to the heater 136*c* so that it follows the temperature change of the heater 136*c*.

The type of heater 136*c* is not limited. In the present embodiment, the heater 136*c* is composed of a resistive heater.

The temperature controller 301 controls the temperature of the heater 136*c*. The temperature controller 301 can be composed of, for example, a triac. A triac is a three-terminal semiconductor switching device that includes a gate terminal and a pair of input-output terminals. A triac can carry current in both directions. The triac enters an on-state when a trigger signal is input to the gate terminal and enters an off-state when the flowing AC current becomes zero. The amount of power flowing through the triac per unit time can be adjusted by controlling the input of the trigger signal to the gate terminal.

The thermostat 302 is disconnected when the temperature of the thermostat 302 exceeds a predetermined temperature. For example, if the temperature of the thermostat 302 becomes too high, the temperature of the heater 136*c* may also become too high, causing the heater 136*c* to fail. When the temperature of the thermostat 302 reaches or exceeds the predetermined temperature, the thermostat 302 is disconnected to shut off the power supply to the heater 136*c*, and the heater 136*c* stops heating.

As illustrated in FIG. 3, a detector 303 included in the controller 202 detects the input of DC power to the fusing device 136, which constitutes the drive. For example, the detector 303 detects the DC current flowing through a circuit 305 including the fusing device 136.

During normal operation, AC power is supplied from the AC power source 200 and virtually no DC power is supplied. Therefore, the detector 303 does not detect DC power. The detector 303 detects DC power when an abnormality or some other problem occurs in the AC power source 200 and DC power is outputted from the AC power source 200.

The detector 303 may be of any system capable of detecting DC power. The detector 303 can be composed of, for example, a current sensor that detects DC current or a voltage sensor that detects DC voltage. In the present embodiment, the detector 303 is specifically composed of a current sensor. The current sensor can be composed of, for example, a Hall element.

The image forming apparatus 100 further includes a shutoff member 310. The shutoff member 310 is composed to be able to shut off the power supply to the fusing device 136, which constitutes the drive. The shutoff member 310 shuts off the power supply to the fusing device 136 on the basis of the detection result by the detector 303. In detail, the shutoff member 310 shuts off the power supply to the fusing device 136 when the detector 303 detects DC power or a parameter related to DC power. More specifically, when the detector 303 detects DC power, the controller 202 outputs a shutoff signal to the shutoff member 310 to shut off the power supply to the fusing device 136. The shutoff member 310 shuts off the power supply to the fusing device 136 when a shutoff signal is inputted. Specifically, the shutoff member 310 shuts off the power supply to other components such as the temperature controller 301 in addition to the fusing device 136 when a shutoff signal is inputted.

In the present embodiment, the shutoff member 310 is provided to suppress a DC current from flowing to the fusing device 136 for more than a predetermined time. Therefore, for example, the application of DC voltage to the fusing device 136, specifically the heater 136*c*, can be suitably suppressed even before the temperature of the thermostat 302 rises and the thermostat 302 is cut off.

For example, if the image forming apparatus is a high-speed machine and the heater temperature is high, the operating temperature of the thermostat must be set high to prevent the thermostat from cutting off unwantedly. When the operating temperature of the thermostat is high, the thermostat does not necessarily operate immediately even if DC voltage is applied to the heater, and there is a risk of DC voltage continuously being applied to the heater until the thermostat becomes hot enough to operate. In some cases, there is a risk of the thermostat being welded by arcing caused by the application of DC voltage before the thermostat operates. A welded thermostat may not operate properly.

In the present embodiment, even if the temperature of the thermostat 302 is low, the power supply to the fusing device 136 is shut off without delay if DC power is detected. Therefore, the thermostat 302 is less likely to be welded. Therefore, the image forming apparatus 100 can be suitably restrained from the application of DC voltage.

The shutoff member 310 is not limited so long as it can shut off power supply. The configuration of the shutoff member 310 in the present embodiment is described in detail below with reference to the drawings.

Figure 4:
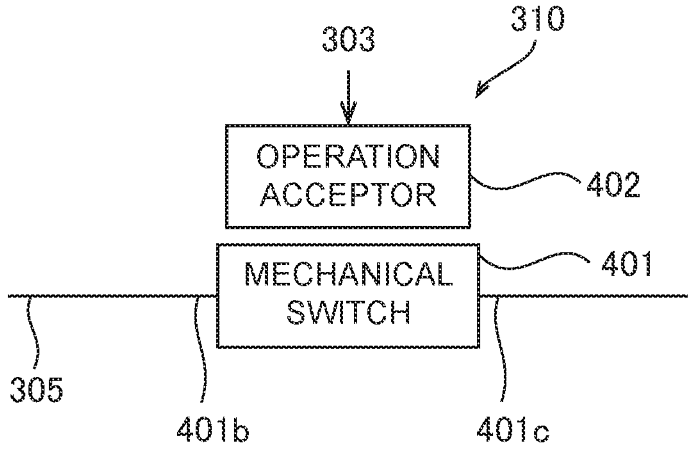
FIG. 4 is a schematic block diagram of a shutoff member according to the first embodiment.

FIG. 4 is a schematic block diagram of the shutoff member 310 according to the first embodiment.

In the present embodiment, the shutoff member 310 turns the power supply on and off with a mechanical switch. Here, a mechanical switch is a part that switches electrical signals by mechanical action. Examples of a mechanical switch include seesaw switches, toggle switches, slide switches, and pushbutton switches.

Specifically, as illustrated in FIG. 4, the shutoff member 310 includes a mechanical switch 401 and an operation acceptor 402.

The mechanical switch 401 is positioned on the circuit 305. A first input-output terminal 401*b* of the mechanical switch 401 illustrated in FIG. 4 is electrically connected to the main switch 201 illustrated in FIG. 3. A second input-output terminal 401*c* of the mechanical switch 401 is connected to the fusing device 136 illustrated in FIG. 3.

The mechanical switch 401 is electrically connected in series to the thermostat 302 and the fusing device 136 (see FIG. 3), which constitutes the drive. The mechanical switch 401 is capable of displacing or changing orientation between an on-state in which power is supplied to the fusing device 136 and an off-state in which no power is supplied to the fusing device 136. That is, the on-state and off-state are switched by the displacing or changing orientation of the mechanical switch 401. The power supply to the fusing device 136 can be shut off by setting the mechanical switch 401 to a position or orientation corresponding to the off-state.

The operation acceptor 402 operates the mechanical switch 401. The operation acceptor 402 is connected to the detector 303. Specifically, the operation acceptor 402 switches the mechanical switch 401 from the on-state to the off-state to shut off the power supply to the fusing device 136 when the detector 303 detects an input of DC power to the fusing device 136. In detail, when the detector 303 detects DC power, the controller 202 outputs a shutoff signal to the operation acceptor 402. The shutoff signal activates the operation acceptor 402, which operates the mechanical switch 401 and changes the state of the mechanical switch 401 from the on-state to the off-state. As a result, the power supply to the fusing device 136 is shut off.

Figure 5:
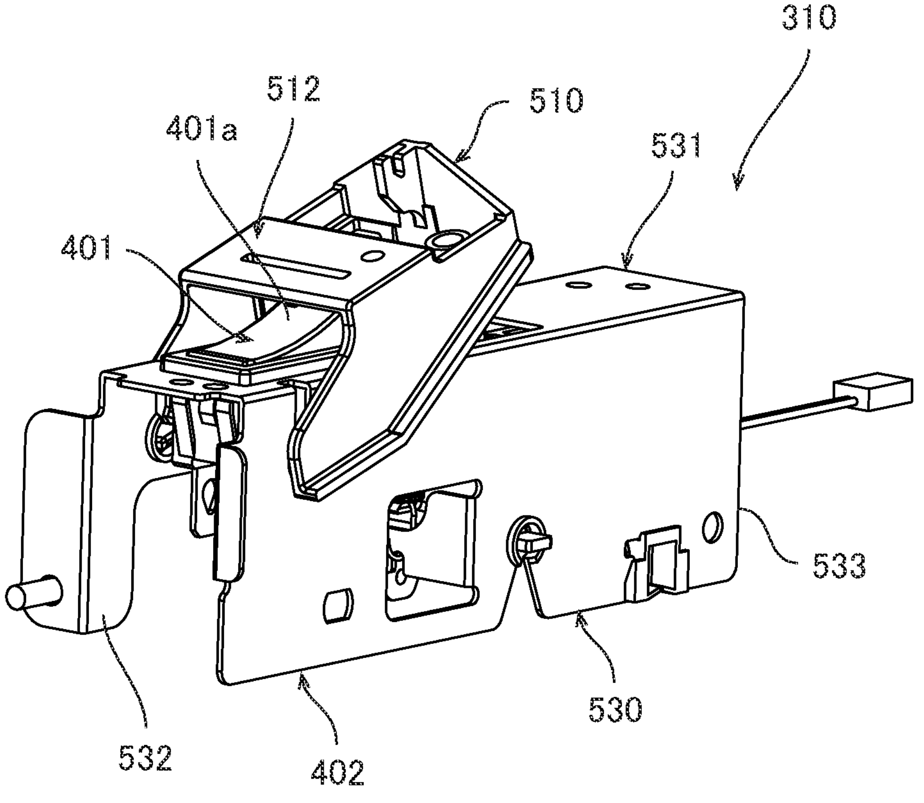
FIG. 5 is a schematic perspective view of the shutoff member according to the first embodiment.
Figure 6:
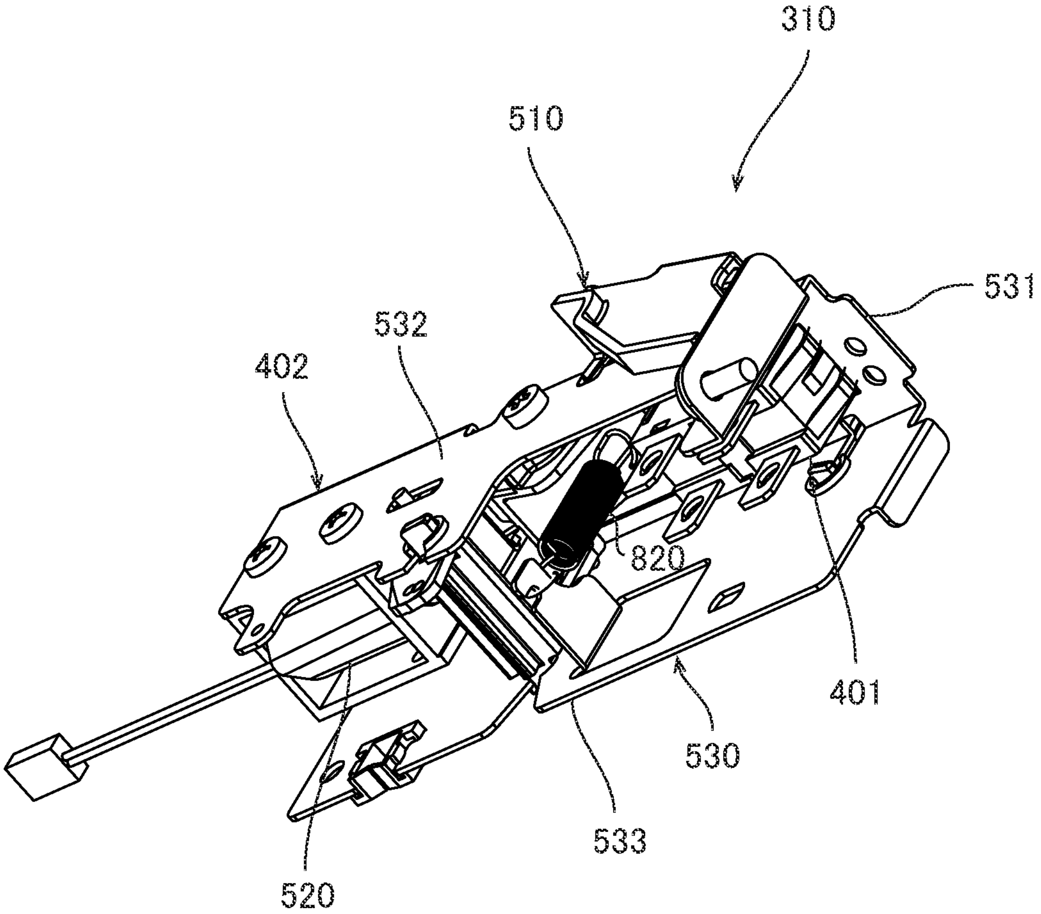
FIG. 6 is a schematic perspective view of the shutoff member according to the first embodiment.
Figure 7:
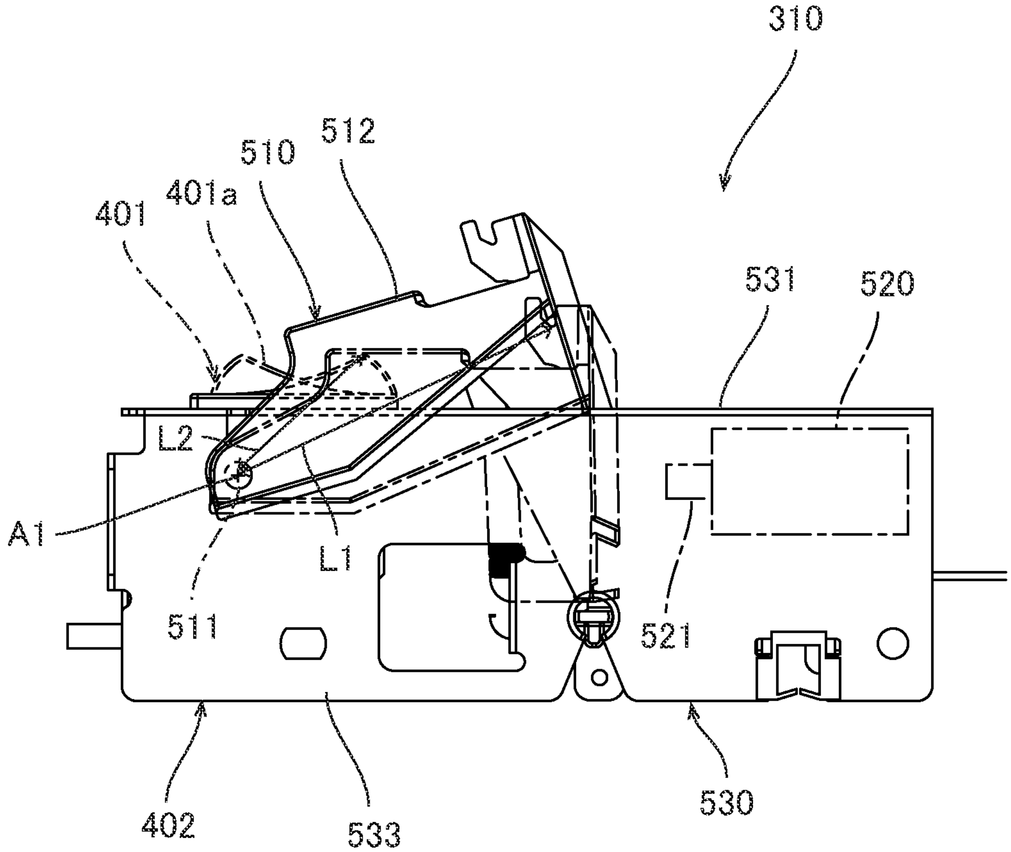
FIG. 7 is a schematic side view of the shutoff member according to the first embodiment.
Figure 8:
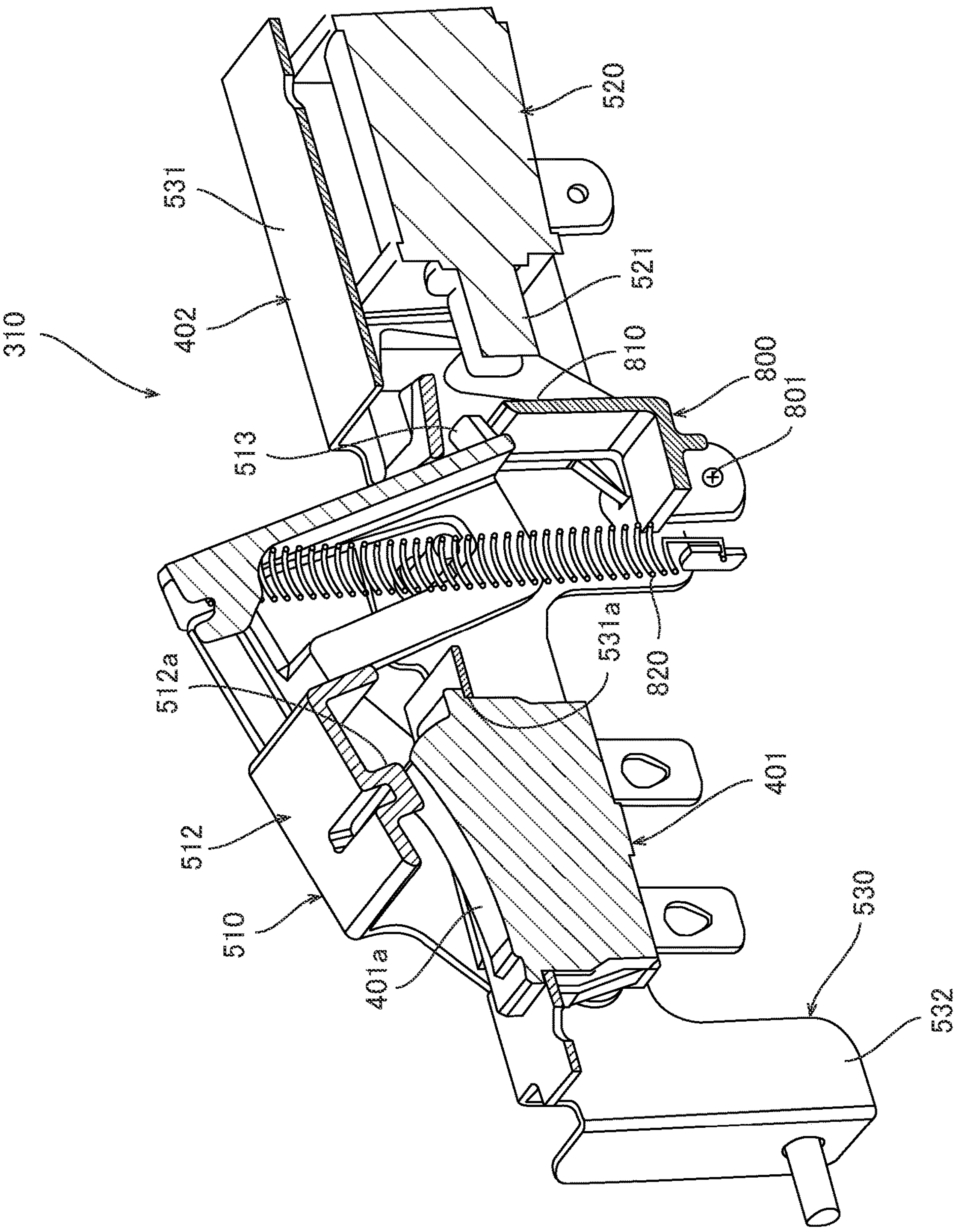
FIG. 8 is a schematic cross-sectional view of the shutoff member in an on-state in the first embodiment.
Figure 9:
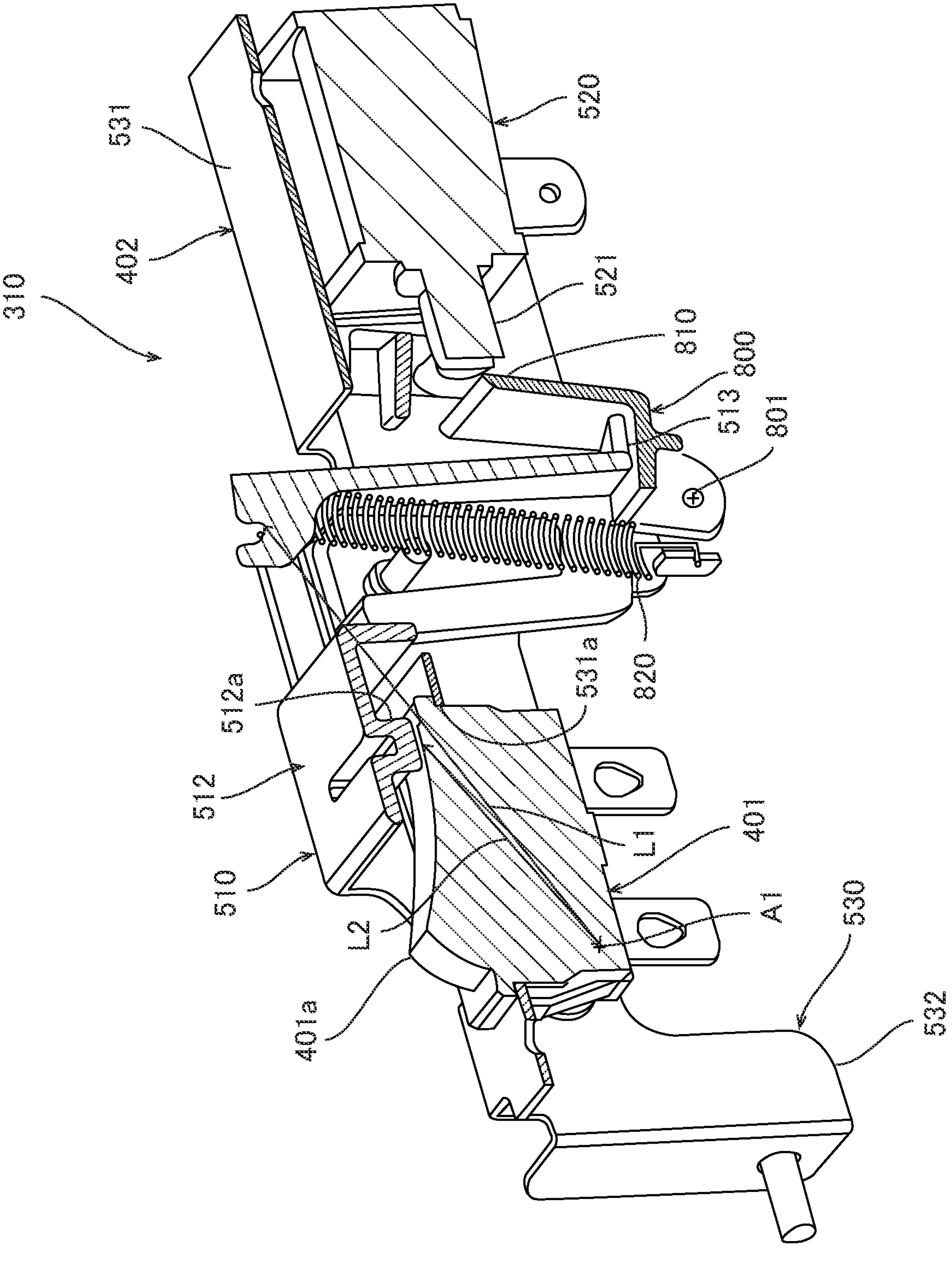
FIG. 9 is a schematic cross-sectional view of the shutoff member in an off-state in the first embodiment.

FIG. 5 is a schematic cross-sectional view of the shutoff member 310 in the on-state in the first embodiment. FIG. 6 is a schematic perspective view of the shutoff member 310 according to the first embodiment. FIG. 7 is a schematic side view of the shutoff member 310 according to the first embodiment. FIG. 8 is a schematic cross-sectional view of the shutoff member 310 in the on-state in the first embodiment. FIG. 9 is a schematic cross-sectional view of the shutoff member 310 in the off-state in the first embodiment.

Next, the specific configuration of the shutoff member 310 is described in detail with reference to FIGS. 5 to 9.

As illustrated in FIGS. 6, 7, 8, and 9, the operation acceptor 402 of the shutoff member 310 includes an operating element 510, an actuator 520, a housing 530, a pivoting member 800, and an urging member 820 (see FIGS. 8 and 9).

As illustrated in FIGS. 5 and 7, the housing 530 has a first portion 531, a second portion 532, and a third portion 533.

In the present embodiment, one side in the direction perpendicular to the plate-like first portion 531 is the "upper side" and the other side is the "lower side".

As illustrated in FIGS. 8 and 9, the first portion 531 is the portion to which the mechanical switch 401 is attached. The first portion 531 has an opening 531*a*. The mechanical switch 401 is attached to the opening 531*a*. In the present embodiment, the mechanical switch 401 is composed of a seesaw switch. The mechanical switch 401 includes a button 401*a*. The mechanical switch 401 is attached to the housing 530 such that the button 401*a* is exposed on the top side through the opening 531*a*.

The button 401*a* can change between an on-orientation illustrated in FIG. 8 and an off-orientation illustrated in FIG. 9. In other words, the button 401*a* can be switched between the on-orientation and the off-orientation.

As illustrated in FIG. 8, in the on-orientation, the portion on the side of the actuator 520 of the button 401*a* is positioned above the portion opposite the actuator 520. When the button 401*a* is in the on-orientation, the mechanical switch 401 enters an on-state, and each component of the image forming apparatus 100 is electrically connected to the AC power source 200. In the on-state, the fusing device 136 illustrated in FIG. 3 is electrically connected to the AC power source 200.

As illustrated in FIG. 9, in the off-orientation, the portion of the button 401*a* opposite the actuator 520 is positioned above the portion of the button 401*a* on the side of the actuator 520. When the button 401*a* is in the off-orientation, the mechanical switch 401 is in the off-state, and each component of the image forming apparatus 100 is electrically disconnected from the AC power source 200. In the off-state, the fusing device 136 illustrated in FIG. 3 is also electrically disconnected from the AC power source 200.

The second portion 532 is connected to one side portion of the first portion 531 in the width direction. The second portion 532 extends from the first portion 531 toward one side (lower side) in a direction perpendicular to the first portion 531. The third portion 533 is connected to other one side portion of the first portion 531 in the width direction. The third portion 533 extends from the first portion 531 toward one side (lower side) in a direction perpendicular to the first portion 531. The third portion 533 and the second portion 532 face each other in the width direction of the first portion 531.

As illustrated in FIG. 5, the operating element 510 is rotatably attached to the housing 530. The operating element 510 is provided to operate the mechanical switch 401 through rotation. The operating element 510 presses the mechanical switch 401 to change or displace the mechanical switch 401 from a first orientation or position, illustrated in FIGS. 7 and 8, in which the on-state of the mechanical switch 401 can be maintained, to a second orientation or position, illustrated in FIGS. 7 and 9, in which the mechanical switch 401 is in an off-state. Specifically, the operating element 510 can rotate from the first orientation, illustrated FIG. 8, where it is not in contact with the button 401*a*, to the second orientation, illustrated in FIG. 9, where it contacts the button 401*a* and maintains the button 401*a* in an off-orientation.

In detail, as illustrated in FIG. 7, the operating element 510 includes a shaft 511. The shaft 511 extends along the width direction (in the direction in which the second portion 532 and the third portion 533 face each other). The shaft 511 is rotatably inserted into openings in the second portion 532 and the third portion 533 of the housing 530. Thus, the operating element 510 can rotate about the shaft 511.

As illustrated in FIGS. 5, 7, 8, and 9, the operating element 510 has a portion 512 positioned above the first portion 531. As illustrated in FIGS. 8 and 9, the portion 512 has a protrusion 512*a* that protrudes toward the mechanical switch 401. The protrusion 512*a* protrudes toward the mechanical switch 401, more specifically, a portion of the button 401*a* on the side of the actuator 520. The rotation of the operating element 510 from the on-orientation illustrated in FIG. 8 to the off-orientation illustrated in FIG. 9 causes the protrusion 512*a* to press the button 401*a* and operate the mechanical switch 401 from on-state to an off-state.

As illustrated in FIGS. 8 and 9, the operating element 510 is connected to the housing 530 by the urging member 820. Specifically, a portion of the operating element 510 remote from the shaft 511 (see FIG. 7) is connected with the lower portion of the housing 530 by the urging member 820. In the present embodiment, the urging member 820 is composed of a resilient member that generates tensile stress. Specifically, the urging member 820 is composed of a spring that generates tensile stress in the extended state in the direction of contraction.

The actuator 520 illustrated in FIGS. 7 to 9 changes or displaces the orientation of the operating element 510 from the first orientation or position in which the on-state of the mechanical switch 401 can be maintained to the second orientation or position in which the mechanical switch 401 is turned off. Specifically, in the present embodiment, the actuator 520 changes the orientation of the operating element 510 from the first orientation to the second orientation. The actuator 520 may directly operate the operating element 510 or indirectly operate the operating element 510 by operating another member. The present embodiment describes an example in which the actuator 520 indirectly operates the operating element 510.

The actuator 520 is not limited to any particular operating element 510 so long as it is capable of directly or indirectly operating the operating element 510. It is particularly preferable that the actuator 520 be an actuator that operates when DC power is inputted. The present embodiment describes an example in which the actuator 520 is composed of a solenoid. The actuator 520 includes an electromagnetic force generator and a core 521. The core 521 can displace relative to the electromagnetic force generator. The core 521 linearly displaces along the direction in which the core 521 extends by the electromagnetic force generated by the electromagnetic force generator.

As illustrated in FIGS. 8 and 9, the tip of the core 521 is connected to the pivoting member 800. In the present embodiment, the pivoting member 800 constitutes a restriction member. The pivoting member 800 can hold the operating element 510 at the first orientation or position against the urging force of the urging member 820 by coming into contact with the operating element 510. The pivoting member 800 changes its orientation or displaces by the actuator 520 so that the pivoting member 800 does not come into contact with the operating element 510.

The pivoting member 800 is attached to the housing 530 so as to be able to pivot about an axis 801. The displace of the core 521 of the actuator 520 causes an upper end 810 of the pivoting member 800 to pivot around the axis 801.

As illustrated in FIG. 8, when the core 521 is positioned adjacent to the pivoting member 800, the upper end 810 is in contact with a stopper 513 provided at the lower end of the operating element 510. This prevents the operating element 510 to enter an off-orientation by the resilient force (tensile stress) of the urging member 820, and the on-orientation of the operating element 510 is maintained.

As illustrated in FIG. 9, with the core 521 positioned remote from the pivoting member 800, the upper end 810 displaces closer to the actuator 520 than the position illustrated in FIG. 8, and the upper end 810 and the stopper 513 do not come into contract with each other. Accordingly, the resilient force (tensile stress) of the urging member 820 causes the operating element 510 to rotate from the orientation illustrated in FIG. 8 to the orientation illustrated in FIG. 9, with the protrusion 320 pressing the button 401*a*. This causes the mechanical switch 401 to enter an off-state.

As illustrated in FIGS. 7 and 9, the operating element 510 rotates about a rotation axis A1 (the center axis of the shaft 511) to change its orientation or displace from the first orientation (the orientation that maintains an on-state as illustrated in FIG. 8) to the second orientation (the orientation of an off-state as illustrated in FIG. 9). A distance L1 between the point of effort where the urging member 820 urges the operating element 510 and the rotation axis A1 is larger than a distance L2 between the point of load of the operating element 510 on the mechanical switch 401 and the rotation axis A1.

As described above, in the present embodiment, the shutoff member 310 shuts off the power supply to the fusing device 136 serving as a drive on the basis of the detection result by the detector 303 illustrated in FIG. 3. Specifically, the shutoff member 310 shuts off the power supply to the fusing device 136 when the detector 303 detects an input of DC power to the fusing device 136. Thus, the input of DC power to the fusing device 136 can be suitably suppressed. Therefore, it is possible to suppress a failure of the fusing device 136 caused by an input of DC power to the fusing device 136, which is driven by AC power. For example, a thermostat could be used to suppress the temperature of a heater included in the fusing device from rising above a predetermined temperature. However, when DC power is inputted to the fusing device, the thermostat may be unwantedly welded before the thermostat is disconnected, and the thermostat may not be suitably disconnected. The temperature controller 301, which is composed of a triac, does not operate with DC power. In the present embodiment, the shutoff member 310 is provided so that an input of DC power to the fusing device 136 can be blocked with a high degree of certainty even if the thermostat 302 is unwantedly welded.

In the present embodiment, the mechanical switch 401 and the thermostat 302 are electrically connected in series to the fusing device 136. Thus, the power supply to the fusing device 136 is shut off when the mechanical switch 401 is turned off and when the thermostat 302 is fused. Therefore, for example, even before DC power is detected by the detector 303 and the mechanical switch 401 is turned off, the thermostat 302 is activated and the power supply to the fusing device 136 is shut off if a large DC current flows and the temperature of the thermostat 302 rises rapidly. In this way, the input of DC power to the fusing device 136 is suppressed when a large DC current flows and when a small DC current flows.

In the present embodiment, the mechanical switch 401 is provided separately to turn on and off the power supply to the fusing device 136. This allows for a high degree of freedom in the design and placement of the mechanical switch 401. For example, the distance between contacts when the mechanical switch 401 is released can be sufficiently large so that the contacts are unwantedly welded due to an input of DC power. For example, the distance between the contacts of the mechanical switch 401 when released can be 2 mm or more, preferably 2.5 mm or more, more preferably 3 mm or more.

In the present embodiment, the urging force of the urging member 820 changes the orientation of the operating element 510 from the first orientation to the second orientation. By using a resilient member such as a spring or rubber as the urging member 820, without obtaining an urging force from electric power or the like, a sufficiently large urging force can be reliably applied to the operating element 510 to operate the switch 401, even in the event of an abnormal power supply. Since the actuator 520 does not need to directly change the orientation of the operating element 510, a large urging force can be applied to the operating element 510 even when the driving force of the actuator 520 is small.

In the present embodiment, the distance L1 between the point of effort where the urging member 820 urges the operating element 510 and the rotation axis A1 is larger than a distance L2 between the point of load of the operating element 510 on the mechanical switch 401 and the rotation axis A1. This allows the force with which the operating element 510 presses the mechanical switch 401 to be greater than the urging force applied to the operating element 510 by the urging member 820. This can reduce the urging force applied to the operating element 510 by the urging member 820, which is required to operate the mechanical switch 401. In other words, the mechanical switch 401 can be operated even when the urging force applied to the operating element 510 by the urging member 820 is small. Therefore, the mechanical strength required for the housing 530 and the operating element 510 is lower than when the urging force of the urging member 820 is set to be higher. As a result, the degree of freedom in the design of the housing 530 and the operating element 510 is increased, and the weight of the input-output terminal operating element 510 can be reduced.

The following is another example of preferred embodiments of the disclosure. In the following description, members having substantially the same functions as those in the first embodiment is be referred to with the common reference signs, and the description thereon is omitted.

Second Embodiment

Figure 10:
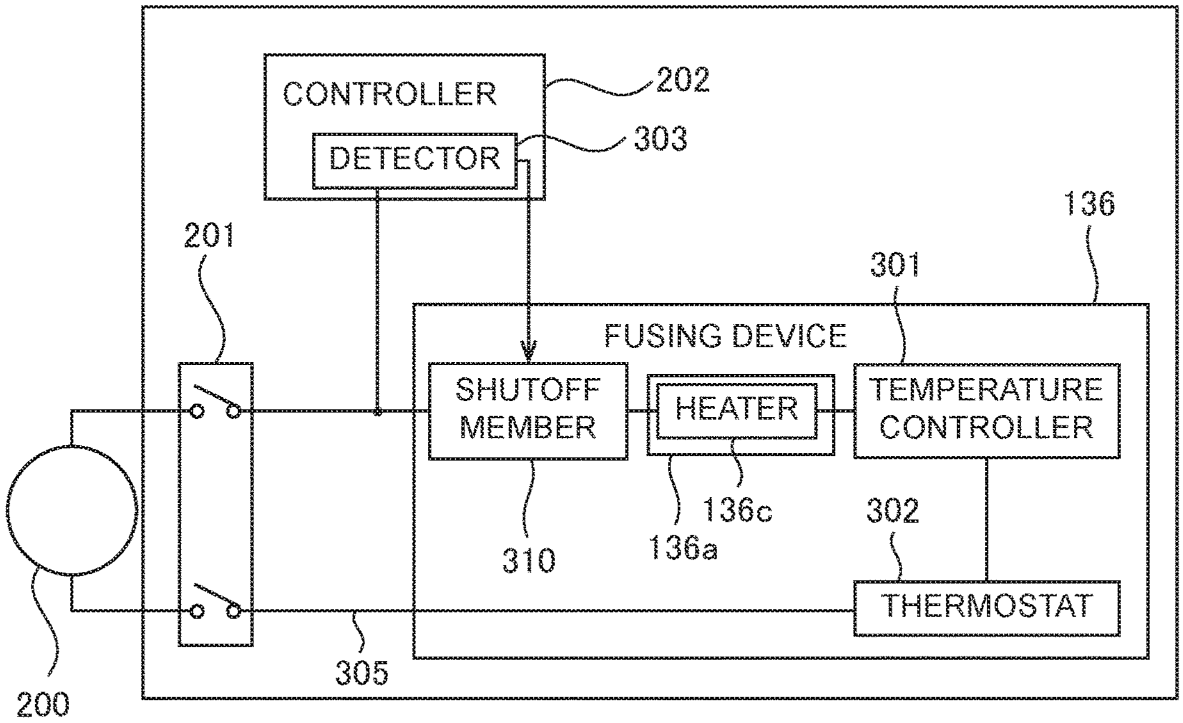
FIG. 10 is a schematic block diagram of a portion including the fusing device of the image forming apparatus according to a second embodiment.

FIG. 10 is a schematic block diagram of a portion including the fusing device 136 of the image forming apparatus according to the second embodiment.

The first embodiment describes an example in which the shutoff member 310 is electrically connected between the main switch 201 and the fusing device 136 serving as a drive. However, the disclosure is not limited to such a configuration. The shutoff member need only be provided upstream (adjacent to the main switch 201) from at least a portion of the drive that could fail if DC power is inputted. For example, the shutoff member 310 need only be provided upstream from the heater 136*c* of the fusing device 136.

As illustrated in FIG. 10, in the present embodiment, the shutoff member 310 is provided inside the fusing device 136. In detail, the mechanical switch 401 is electrically connected to the portion upstream from the heater 136*c* inside the fusing device 136. Even in such a case, as in the first embodiment, the input of DC power to the heater 136*c* can be suitably suppressed.

When the shutoff member 310 is provided inside the fusing device 136, it is difficult for the user of the image forming apparatus 100 to operate the shutoff member 310 (specifically, the mechanical switch 401) to return it to the on-state. Therefore, in the present embodiment, the controller 202 may operate the shutoff member 310 so that the power supply to the fusing device 136 is resumed via the shutoff member 310 when a predetermined condition is satisfied in a state where the shutoff member 310 shuts off the power supply to the fusing device 136 serving as a drive.

The controller 202 may control the shutoff member 310 so that the power supply to the heater 136*c* of the fusing device 136 is resumed after the detector 303 no longer detects DC current. The controller 202 may further include a voltage detector that detects the voltage at the main switch 201 and control the shutoff member 310 so that the power supply to the heater 136*c* of the fusing device 136 is resumed after the voltage detector no longer detects DC voltage. The controller 202 may control the shutoff member 310 so that the power supply to the heater 136*c* of the fusing device 136 is resumed when an ON instruction from a user is input to the operation panel or the like of the image forming apparatus 100.

The input of DC power to the heater 136*c* can be suppressed by electrically disconnecting the circuit 305 at any point. Therefore, the shutoff member 310 may be provided in a portion upstream from the heater 136*c* or in a portion downstream.

The present embodiment describes an example in which DC power input to a portion of the circuit 305 between the main switch 201 and the fusing device 136 is detected by the detector 303. However, the detection position of the DC power by the detector 303 is not limited. The detector 303 may detect input of DC power to any portion connected in series with the heater 136*c*.

The first embodiment describes an example that uses the urging member 820 that urges the operating element 510 from the first orientation or position to the second orientation or position side. However, the disclosure is not limited to such a configuration. The operation acceptor 402 is not particularly limited so long as it is capable of operating the mechanical switch 401. Other configurations of the operation acceptor are described below.

Specifically, the third to fifth embodiments below describe examples in which an actuator directly applies stress to an operating element to operate the mechanical switch 401. The third to fifth embodiments share FIG. 3 with the first embodiment as reference.

Third Embodiment

Figure 11:
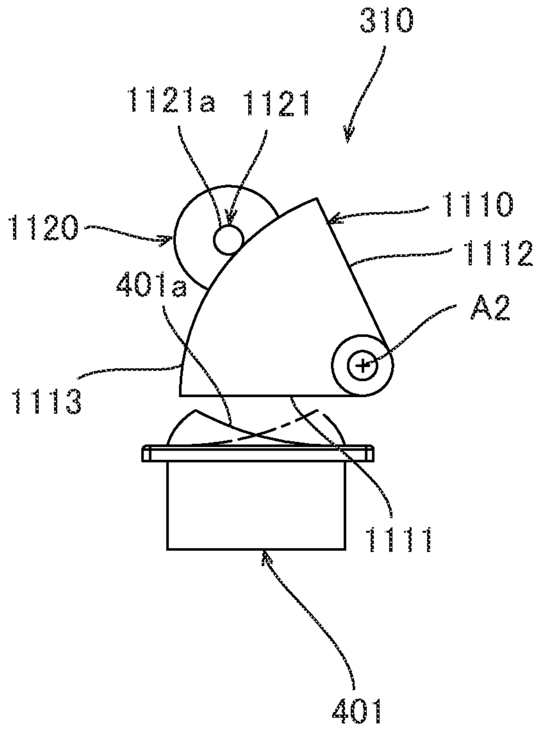
FIG. 11 is a schematic view of a shutoff member according to a third embodiment.

FIG. 11 is a schematic view of the shutoff member 310 according to the third embodiment.

As illustrated in FIG. 11, the shutoff member 310 according to the third embodiment includes an operating element 1110 and an actuator 1120.

The operating element 1110 is fan-shaped plate. That is, the operating element 1110 is a plate having a fan-shape in plan view. The fan shape includes those with a central angle of 180 degrees or more.

The operating element 1110 is rotatable about a center axis A2. The center axis A2 extends along a direction perpendicular to the direction of the plate surface of the operating element 1110. In plan view, the operating element 1110 has a first side surface 1111 and a second side surface 1112 extending radially outward from the center axis A2 side, and a peripheral surface 1113 connecting the first side surface 1111 and the second side surface 1112. The first side surface 1111 is opposite the button 401*a* of the mechanical switch 401. The operating element 1110 rotates about the center axis A2 to press the button 401*a*. This causes the mechanical switch 401 to transition from an on-state to an off-state.

The actuator 1120 is specifically composed of a rotor including a rotary shaft 1121. The rotor can be composed of, for example, a motor. The motor may be, for example, a servo motor that can be stopped at a predetermined rotational position.

A peripheral surface 1121*a* of the shaft 1121 engages with the peripheral surface 1113 of the operating element 1110. Thus, the rotation of the shaft 1121 of the actuator 1120 causes the operating element 1110 to rotate. Specifically, in the present embodiment, the shaft 1121 rotates clockwise, as viewed on the surface of the page. This causes the operating element 1110 to rotate counterclockwise, as viewed on the surface of the page. This rotates the first side surface 1111 counterclockwise and presses the button 401*a*. As a result, the button 401*a* changes its orientation from the first orientation in which an on-state can be maintained to the second orientation in which the button 401*a* enters an off-state.

The term "engaged" means that multiple members rotate together by a frictional force or the like. For example, gears may be formed on the peripheral surfaces of the two engaging members, and the gears may engage with each other. The two members may rotate together, for example, by being substantially non-slip between the two engaging peripheral surfaces due to a frictional force.

In the present embodiment, when the detector 303 (see FIG. 3) detects DC power, power is supplied to the actuator 1120 to activate the actuator 1120. As a result, the operating element 1110 rotates to turn off the mechanical switch 401. Even in the present embodiment, as in the first embodiment, the input of DC power to the fusing device 136 can be effectively suppressed.

Fourth Embodiment

Figure 12:
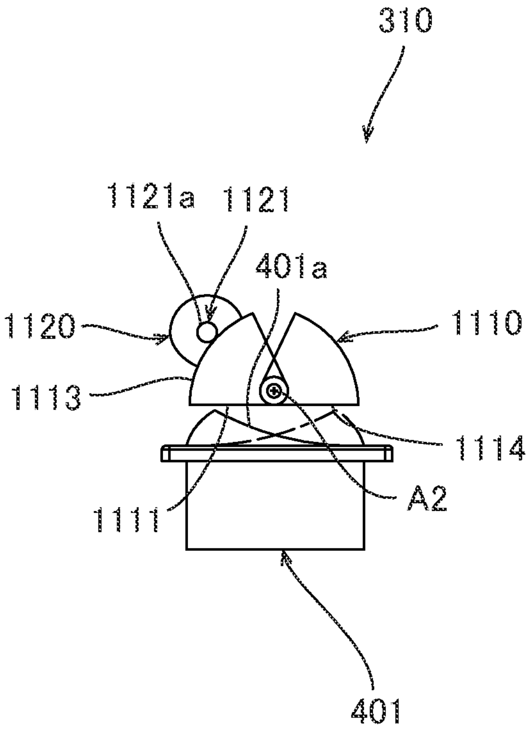
FIG. 12 is a schematic view of a shutoff member according to a fourth embodiment.

FIG. 12 is a schematic view of the shutoff member 310 according to the fourth embodiment.

The third embodiment describes an example in which the first side surface 1111 can operate the button 401*a* in the first orientation corresponding to an on-state, while the first side surface 1111 cannot operate the button 401*a* in the second orientation corresponding to an off-state. That is, the third embodiment describes an example in which the mechanical switch 401 can be turned off, but not on. In such a case, the mechanical switch 401 can be turned on again, for example, by manually operating the mechanical switch 401.

As illustrated in FIG. 12, in the fourth embodiment, the operating element 1110 has a first side surface 1111 and a third side surface 1114. The first side surface 1111 is opposite the portion of the button 401*a* protruding toward the operating element 1110 when the mechanical switch 401 is in an on-state. The third side surface 1114 is opposite the portion of the button 401*a* protruding toward the operating element 1110 when the mechanical switch 401 is in an off-state. In a direction perpendicular to the direction in which the operating element 1110 and the mechanical switch 401 face each other, the rotation axis A2 is positioned between a portion of the button 401*a* that protrudes toward the operating element 1110 in an on-state and a portion that protrudes toward the operating element 1110 in an off-state. Thus, when the operating element 1110 rotates clockwise, as viewed on the surface of the page, by the actuator 1120, the first side surface 1111 rotates counterclockwise, as viewed on the surface of the page. As a result, the first side surface

1111 presses the button 401*a* in an on-state, and the mechanical switch 401 enters an off-state. When the operating element 1110 rotates counterclockwise, as viewed on the surface of the page, by the actuator 1120, the third side surface 1114 rotates clockwise, as viewed on the surface of the page. As a result, the third side surface 1114 presses the button 401*a* in an off-state, and the mechanical switch 401 enters an on-state.

In the third embodiment, similar to the second embodiment, when the detector 303 (see FIG. 3) detects DC power, power is supplied to the actuator 1120 to activate the actuator 1120. As a result, the operating element 1110 rotates counterclockwise, as viewed on the surface of the page, and the mechanical switch 401 is turned off. Even in the present embodiment, as in the first and second embodiments, the input of DC power to the fusing device 136 can be effectively suppressed.

In the present embodiment, the controller 202 (see FIG. 3) counts the time since the power supply to the fusing device 136 is turned off by the shutoff member 310. The controller 202 outputs a return signal to the shutoff member 310 when the elapsed time since the power supply to the fusing device 136 is turned off exceeds a predetermined time.

When the shutoff member 310 receives the return signal, the actuator 1120 rotates the shaft 1121 counterclockwise, as viewed on the surface of the page. Together with this, the third side surface 1114 rotates clockwise, as viewed on the surface of the page. As a result, the third side surface 1114 presses the button 401*a* in an off-state, and the mechanical switch 401 enters an on-state. If the detector 303 detects DC power again at that time, the mechanical switch 401 is turned off again. On the other hand, if the detector 303 does not detect DC power, the on-state is maintained.

In the present embodiment, after DC power has been detected and the mechanical switch 401 enters an off-state, the mechanical switch 401 can automatically return to an on-state without manual operation.

Fifth Embodiment

Figure 13:
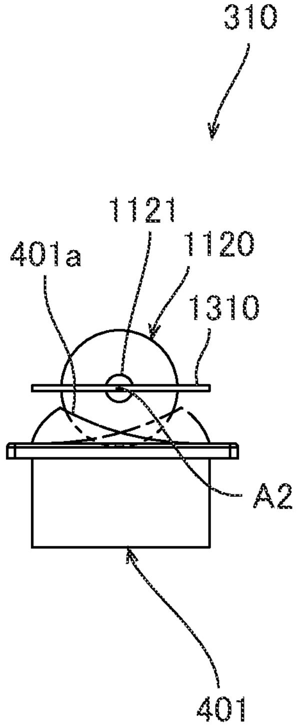
FIG. 13 is a schematic view of a shutoff member according to a fifth embodiment.

FIG. 13 is a schematic view of the shutoff member 310 according to the fifth embodiment.

The third and fourth embodiments described an example in which the operating element 1110 is engaged with the actuator 1120. However, the disclosure is not limited to such a configuration.

For example, as illustrated in FIG. 13, a plate-shaped operating element 1310 may be fixed to the shaft 1121 of the actuator 1120.

Since the operation of the shutoff member 310 according to the present embodiment is substantially the same as the operation of the shutoff member 310 according to the fourth embodiment, the description of the fourth embodiment is cited and the detailed description of the operation of the shutoff member 310 according to the present embodiment is omitted.

Other Embodiments

The above embodiments describe examples in which a shutoff member shuts off the power supply to a drive when the detector detects input of DC power to the fusing device serving as the drive. However, the disclosure is not limited to such a configuration. For example, the shutoff member may shut off the power supply to the drive when the detector detects DC power above a predetermined voltage or DC power above a predetermined current. Even if the detector detects input of DC power to the fusing device, the shutoff member is not necessarily required to shut off the power supply to the drive when the detected DC power per unit time is sufficiently small. The power supply to the drive may be shut off when a DC power of a magnitude expected to adversely affect the drive is detected. That is, the detector that detects input of DC power to the drive may detect input of DC power of a predetermined magnitude (e.g., predetermined voltage, predetermined current) or greater.

The shutoff member is not particularly limited so long as it can shut off power supply to the drive. For example, the shutoff member may be composed of a fuse and a disconnecting member that applies a current greater than the rated current to the fuse to break the fuse. In such a case, the disconnecting member can be composed of, for example, a heater. When the power supply to the drive is shut off, the controller may cause the heater constituting the disconnecting member to generate heat to heat and melt the fuse. However, if a fuse is used, it is non-reversible. Therefore, the fuse must be replaced in order to return to an on-state. Therefore, it is preferred that the shutoff member be reversible between an on-states and an off-state, such as a mechanical switch.

For example, the shutoff member may shut off the power supply to the drive by mutually equalizing the potentials on both sides of the drive.

The mechanical switch may be exposed from the housing 110 (see FIG. 1) or may be positioned at a position operable by the user.

In the first embodiment, an example in which the actuator 520 is composed of a solenoid element is described. However, the disclosure is not limited to such a configuration. The actuator may be composed of, for example, a hydraulic cylinder or the like.

The disclosure is not limited to the above-described embodiments and can be modified, and the above-described configuration can be replaced by a substantially identical configuration, a configuration that produces the same effect, or a configuration that can achieve the same purpose.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image forming apparatus comprising:
- a drive that is driven by alternating current (AC) power;
- a detector that detects an input of direct current (DC) power to the drive; and
- a switch that shuts off power supply to the drive based on a detection result by the detector, wherein the switch comprises:
- a mechanical switch that is capable of displacing between or changing orientation between an on-state and an off-state, the on-state being a state in which power is supplied to the drive, the off-state being a state in which no power is supplied to the drive, and
- an operation acceptor, the operation acceptor comprises:
- a protrusion including a housing within which the mechanical switch is attached, the protrusion being configured to press a button to which an electrical contact of the mechanical switch is connected,
- an actuator, and
- an urging member, the operation acceptor moves, using the actuator and the urging member, the protrusion to cause the protrusion to press the button to switch the mechanical switch from the on-state to the off-state when the detector detects the DC power, the operation acceptor further comprises an operating element having the protrusion and being rotatably attached to the housing, the operating element rotates in such a manner as to cause an orientation change or a displacement of the mechanical switch from a first orientation or position to a second orientation or position, to cause the protrusion to press the button of the mechanical switch, the first orientation or position being an orientation or position in which the on-state is maintainable, the second orientation or position being an orientation or position in which the mechanical switch enters the off-state, the actuator subjects the operating element to the orientation change or the displacement from the first orientation or position to the second orientation or position, the urging member is composed of a spring or rubber that urges the operating element in such a direction as to rotate toward the second orientation or position, the operation acceptor further comprises a restriction member that comes into contact with the operating element to restrict the operating element from rotating from the first orientation or position to the second orientation or position against an urging force of the urging member, the restriction member having a rotation axis and being attached to the housing so as to be able to pivot about the rotation axis, the actuator switches a position of pivot of the restriction member, and based on the position of pivot, the operating element is switched, by the restriction member, between a position for restricting a rotation caused by the urging member and a position for not restricting the rotation.

2. The image forming apparatus according to claim 1, wherein, the operating element rotates about a rotation axis to change from the first orientation or position to the second orientation or position, and a distance between a point of effort where the urging member urges the operating element and the rotation axis is greater than a distance between a point of load of the operating element on the mechanical switch and the rotation axis.

3. An image forming apparatus comprising:

a drive that is driven by alternating current (AC) power;

a detector that detects an input of direct current (DC) power to the drive; and a switch that shuts off power supply to the drive based on a detection result by the detector, wherein the switch comprises:

a mechanical switch that is capable of displacing between or changing orientation between an on-state and an off-state, the on-state being a state in which power is supplied to the drive, the off-state being a state in which no power is supplied to the drive, and an operation acceptor, the operation acceptor comprises:

a protrusion including a housing within which the mechanical switch is attached, the protrusion being configured to press a button to which an electrical contact of the mechanical switch is connected, and an actuator, the operation acceptor moves, using the actuator, the protrusion to cause the protrusion to press the button to switch the mechanical switch from the on-state to the off-state when the detector detects the DC power, the operation acceptor further comprises:

an operating element that is a fan-shaped plate having a side surface and is capable of changing from a first orientation to a second orientation by rotating about a center axis and causing the side surface to press the mechanical switch, the first orientation being an orientation in which the on-state is maintainable, the second orientation being an orientation in which the mechanical switch enters the off-state, and the actuator comprises a shaft having a peripheral surface engaging with a peripheral surface of the operating element and causes the operating element to rotate from the first orientation to the second orientation.

4. An image forming apparatus comprising:

a drive that is driven by alternating current (AC) power;

a detector that detects an input of direct current (DC) power to the drive; and a switch that shuts off power supply to the drive based on a detection result by the detector, wherein the switch comprises:

a mechanical switch that is capable of displacing between or changing orientation between an on-state and an off-state, the on-state being a state in which power is supplied to the drive, the off-state being a state in which no power is supplied to the drive, and an operation acceptor, the operation acceptor comprises:

a protrusion including a housing within which the mechanical switch is attached, the protrusion being configured to press a button to which an electrical contact of the mechanical switch is connected, an actuator, and an urging member, the operation acceptor moves, using the actuator and the urging member, the protrusion to cause the protrusion to press the button to switch the mechanical switch from the on-state to the off-state when the detector detects the DC power, the operation acceptor further comprises an operating element having the protrusion and being rotatably attached to the housing, the operating element rotates in such a manner as to cause an orientation change or a displacement of the mechanical switch from a first orientation or position to a second orientation or position, to cause the protrusion to press the button of the mechanical switch, the first orientation or position being an orientation or position in which the on-state is maintainable, the second orientation or position being an orientation or position in which the mechanical switch enters the off-state, the actuator subjects the operating element to the orientation change or the displacement from the first orientation or position to the second orientation or position, the urging member is composed of a spring or rubber that urges the operating element in such a direction as to rotate toward the second orientation or position, the operation acceptor further comprises a restriction member that comes into contact with the operating element to restrict the operating element from rotating from the first orientation or position to the second orientation or position against an urging force of the urging member, the restriction member being a L-shape structure and being provided pivotably in the housing, the actuator switches a position of pivot of the restriction member, and based on the position of pivot, the operating element is switched, by the restriction member, between a position for restricting a rotation caused by the urging member and a position for not restricting the rotation.

* * * * *